(12) United States Patent
Styles

(10) Patent No.: US 8,108,415 B2
(45) Date of Patent: *Jan. 31, 2012

(54) QUERY TRANSFORMATION

(75) Inventor: Michael E. Styles, Osgoode (CA)

(73) Assignee: International Business Machines Corporation, Armonk, NY (US)

( * ) Notice: Subject to any disclaimer, the term of this patent is extended or adjusted under 35 U.S.C. 154(b) by 650 days.

This patent is subject to a terminal disclaimer.

(21) Appl. No.: 12/283,194

(22) Filed: Sep. 9, 2008

(65) Prior Publication Data

US 2009/0063441 A1 Mar. 5, 2009

Related U.S. Application Data

(63) Continuation of application No. 10/856,306, filed on May 27, 2004, now Pat. No. 7,428,532.

(30) Foreign Application Priority Data

May 27, 2003 (CA) ..................................... 2429910

(51) Int. Cl.
*G06F 17/30* (2006.01)
(52) U.S. Cl. ........................................................ 707/760
(58) Field of Classification Search .................. 707/756, 707/759–763
See application file for complete search history.

(56) References Cited

U.S. PATENT DOCUMENTS

| | | | |
|---|---|---|---|
| 5,963,936 A | 10/1999 | Cochrane et al. | |
| 6,009,432 A | 12/1999 | Tarin | |
| 6,128,612 A * | 10/2000 | Brereton et al. | 707/3 |
| 6,289,334 B1 * | 9/2001 | Reiner et al. | 707/2 |
| 6,339,775 B1 * | 1/2002 | Zamanian et al. | 707/1 |
| 6,341,281 B1 | 1/2002 | MacNicol et al. | |
| 6,345,272 B1 | 2/2002 | Witkowski et al. | |
| 6,370,524 B1 * | 4/2002 | Witkowski | 707/2 |
| 6,370,541 B1 * | 4/2002 | Chou et al. | 707/1 |
| 6,438,537 B1 | 8/2002 | Netz et al. | |
| 6,460,027 B1 | 10/2002 | Cochrane et al. | |

(Continued)

FOREIGN PATENT DOCUMENTS

EP 1081611 A2 3/2001

(Continued)

OTHER PUBLICATIONS

"European Search Report", 04012635.1, Aug. 8, 2005, 4 pages.

(Continued)

*Primary Examiner* — Christyann Pulliam
(74) *Attorney, Agent, or Firm* — Stephen R. Tkacs; Stephen J. Walder, Jr.; Erin C. Ming

(57) ABSTRACT

A mechanism is provided for transforming an original database query into a supported database query that can be fully computed by a target database. The original database query comprising a select list including a plurality of expressions, the plurality of expressions having a control break. The plurality of expressions includes an expression that cannot be directly computed by the target database. The mechanism constructs a derived table from the unsupported database query comprising constructing a new select list of the derived table, traversing the plurality of expressions of the select list of the unsupported database query, and adding a GROUP BY expression to the derived table based on the new select list of the derived table. The mechanism constructs the supported database query using the unsupported database query and the derived table.

19 Claims, 3 Drawing Sheets

U.S. PATENT DOCUMENTS

| | | | |
|---|---|---|---|
| 6,519,604 B1 | 2/2003 | Acharya et al. | |
| 6,567,802 B1 | 5/2003 | Popa et al. | |
| 6,574,623 B1 | 6/2003 | Leung et al. | |
| 6,609,123 B1 | 8/2003 | Cazemier et al. | |
| 6,611,838 B1 | 8/2003 | Ignat et al. | |
| 6,629,094 B1 * | 9/2003 | Colby et al. | 707/713 |
| 6,651,055 B1 | 11/2003 | Kilmer et al. | |
| 6,684,204 B1 | 1/2004 | Lal | |
| 6,714,928 B1 | 3/2004 | Calow | |
| 6,766,330 B1 * | 7/2004 | Chen et al. | 707/5 |
| 6,847,962 B1 | 1/2005 | Cochrane et al. | |
| 6,934,712 B2 | 8/2005 | Kiernan et al. | |
| 6,985,895 B2 | 1/2006 | Witkowski et al. | |
| 7,110,999 B2 * | 9/2006 | Colby et al. | 707/802 |
| 7,120,645 B2 | 10/2006 | Manikutty et al. | |
| 7,133,865 B1 | 11/2006 | Pedersen et al. | |
| 7,275,056 B2 * | 9/2007 | Cheng et al. | 707/4 |
| 7,315,849 B2 | 1/2008 | Bakalash et al. | |
| 7,318,058 B2 | 1/2008 | Styles | |
| 7,428,532 B2 * | 9/2008 | Styles | 707/4 |
| 7,765,222 B2 | 7/2010 | Styles et al. | |
| 7,769,769 B2 * | 8/2010 | Rasmussen | 707/756 |
| 7,917,463 B2 * | 3/2011 | Dagum et al. | 707/600 |
| 2001/0037345 A1 | 11/2001 | Kiernan et al. | |
| 2002/0059203 A1 | 5/2002 | Witkowski et al. | |
| 2002/0087524 A1 | 7/2002 | Leathers | |
| 2002/0107840 A1 | 8/2002 | Rishe | |
| 2002/0188600 A1 | 12/2002 | Lindsay et al. | |
| 2003/0066051 A1 | 4/2003 | Karr et al. | |
| 2003/0088558 A1 * | 5/2003 | Zaharioudakis et al. | 707/3 |
| 2003/0101169 A1 | 5/2003 | Bhatt et al. | |
| 2003/0115194 A1 | 6/2003 | Pitts et al. | |
| 2004/0133567 A1 | 7/2004 | Witkowski et al. | |
| 2004/0181537 A1 | 9/2004 | Chawla et al. | |
| 2005/0010569 A1 | 1/2005 | Styles | |
| 2005/0010570 A1 | 1/2005 | Styles | |
| 2005/0015369 A1 | 1/2005 | Styles et al. | |
| 2005/0038782 A1 | 2/2005 | Styles et al. | |

FOREIGN PATENT DOCUMENTS

| | | |
|---|---|---|
| WO | WO 03/012698 A2 | 2/2003 |
| WO | WO 03/038662 A1 | 5/2003 |

OTHER PUBLICATIONS

"European Search Report", Jul. 28, 2005 for Application No. EP 04012615, 6 pages.

"European Search Report", Jul. 28, 2005 for Application No. EP04012613, 2 pages.

"European Search Report", EP04076566, Aug. 8, 2005, 4 pages.

"European Search Report", Aug. 17, 2005 for Application No. EP 04012614, 4 pages.

"Oracle Technology Network—Discussion Forums", Online, http://forums.oracle.com/forums/thread.jspa?messageIDS=343362񓵂, XP-002337527, retrieved Jul. 22, 2005.

Chiou, A S. et al., "Optimization for queries with holistic functions", Abstract, Database Systems for Advanced Applications, Proceedings of the Seventh International Conference on Volume, Piscataway, New Jersey, Apr. 18, 2001, pp. 327-334.

Johnson, Theodore et al., "Extending Complex Ad-Hoc OLAP", Association for Computing Machinery, Proceedings of the 8th International Conference on Information Knowledge Management, CIKM '99, Kansas City, Missouri, Nov. 2-6, 1999, ACM CIKM International Conference on Information and Knowledge Management, New York, Nov. 1999, pp. 170-179.

Lee, Sang-Won, "SQL/OLAP", PowerPoint presentation, http://vldb.skku.ac.kr/vldb/talk/sql-olap.ppt, Jul. 12, 2001, 32 pages.

Pirahesh, Hamid et al., "A Rule Engine for Query Transformation in Starburst and IBM DB2 C/S DBMS", Published Apr. 1997, pp. 391-400.

Ross, Kenneth A. et al., "Complex Aggregation at Multiple Granularities", Lecture Notes in Computer Science, vol. 1377, 1998, pp. 263-277.

Schwarz, Holger et al., "Improving the Processing of Decision Support Queries: The Case for a DSS Optimizer", Proceedings, International Database Engineering and Applications Symposium, Jul. 16, 2001, pp. 177-186, XP002275210.

Schwarz, Holger et al., "Improving the Processing of Decision Support Queries: Strategies for a DSS Optimizer", University Stuttgart, Technical Report TR-2001-02, Germany, May 2001, pp. 1-20.

Sordi, J.J., "The Query Management Facility", IBM Systems Journal, 1984, vol. 23, No. 2, pp. 126-150. 1984, pp. 126-150.

Winter, Richard, "SQL-99's New OLAP Functions", Intelligent Enterprise Magazine, Online, vol. 3, No. 2, Jan. 20, 2000, XP002337528, 10 pages.

Zemke, Fred et al., "Introduction to OLAP Functions", Online! Apr. 12, 1999, XP002338253, pp. 1-38.

Liebling, Michael, "*Matlab* vs. *IDL*", Biomedical Imaging Group, Feb. 28, 2002, 5 pages.

Canadian Office Action mailed Sep. 9, 2009; Application No. 2,468,403; 3 pages.

U.S. Appl. No. 10/854,638; Image File Wrapper printed, Sep. 15, 2010, 5 pages.

U.S. Appl. No. 10/855,078; Image File Wrapper printed, Sep. 15, 2010, 2 pages.

U.S. Appl. No. 10/856,305; Image File Wrapper printed, Sep. 15, 2010, 4 pages.

U.S. Appl. No. 10/856,306; Image File Wrapper printed, Sep. 15, 2010, 3 pages.

U.S. Appl. No. 10/856,747; Image File Wrapper printed, Sep. 15, 2010, 4 pages.

U.S. Appl. No. 10/856,748; Image File Wrapper printed, Sep. 15, 2010, 4 pages.

"Microsoft Computer Dictionary, Fifth Edition", Microsoft Press, (Published May 2002), [Retrieved on Aug. 12, 2010], Retrieved from Internet: http://proquest.safaribooksonline.com/0735614954, Print ISBN-13: 978-0-7356-1495-6, 2 pages.

* cited by examiner

QUERY TRANSFORMATION

CROSS-REFERENCE TO RELATED APPLICATIONS

The present application is a continuation application claiming priority from U.S. application Ser. No. 10/856,306, filed May 27, 2004, now U.S. Pat. No. 7,428,532, the content of which is incorporated by reference herein in its entirety.

FIELD OF THE INVENTION

The invention relates generally to data access middleware, and in particular to a system and method of query transformation.

BACKGROUND OF THE INVENTION

A typical data access environment has a multi-tier architecture. For description purposes, it can be separated into three distinct tiers:
 Web server
 Applications
 Data
The tiers are based on business function, and are typically separated by firewalls. Client software, such as a browser or a report-authoring tool, sits above the tiers.

The web server contains a firewall and one or more gateways. All web communication is performed through a gateway. A gateway is responsible for passing on requests to the application server, in tier 2, for execution.

The applications tier contains one or more application servers. The application server runs requests, such as reports and queries that are forwarded by a gateway running on the web server. Typically, one of the components of the applications tier is a query engine, which is data access middleware that provides universal data access to a variety of heterogeneous database systems. The query engine formulates queries (typically SQL) and passes them on to the data tier, through a native database API (such as ODBC) for execution.

The data tier contains database management systems (DBMS), which manage raw data stored in a database. Examples of such systems include Oracle, DB2, and Microsoft SQL Server.

Although a multi-tier architecture can be configured in several different ways, a typical configuration places each tier on a separate computer (server). A database server is typically a "high end" server, and thus can process queries at a relatively fast speed. An application server cannot generally process queries as quickly as a database server.

In order to solve many business questions, a query engine may generate SQL queries that utilize the SQL/OLAP technology introduced in the SQL: 1999 standard. However, many database systems do not support this technology. Thus, the SQL queries would have to be performed by the query engine on the application server that is generally slower than the database server. It is desirable to have as much processing performed on the database server as possible.

There is a need to prevent or reduce the amount of local (application server) processing required to process a query. In the past, the application would be responsible for generating SQL that contained a standard GROUP BY query. Quite often, generating this type of SQL is more difficult since it is more complex.

One way of overcoming this problem is for the query engine to generate a GROUP BY query to compute aggregates at the lowest level of granularity, and then compute the remaining aggregates based on these values. This approach reduces the amount of processing time required on the application server.

SUMMARY OF THE INVENTION

It is an object of the present invention to provide a method of Client/Server Aggregate query transformation in a database system that does not support SQL: 1999 standard.

In accordance with an embodiment of the present invention, there is provided a system for transforming client/server aggregates. The system comprises a client/server analysis component for analyzing one or more queries that are not supported by a target database system, and a client/server transformation component for transforming the one or more queries into semantically equivalent queries that are supported by the target database system.

In accordance with another embodiment of the present invention, there is provided a method of client/server aggregate transformation. The method comprises the steps of analyzing one or more queries that are not supported by a target database system, and transforming the one or more queries into semantically equivalent queries that are supported by the target database system.

In accordance with another embodiment of the present invention, there is provided a method of client/server aggregate transformation. The method comprises the steps of analyzing a client/server select list to determine if a transformation is to be performed, generating a derived table, traversing all expressions in the main select list, adding columns or expressions that are grouping columns to the derived table select list, and converting and moving eligible aggregates into the derived table select list.

In accordance with another embodiment of the present invention, there is provided a computer data signal embodied in a carrier wave and representing sequences of instructions which, when executed by a processor, cause the processor to perform a method of client/server aggregate transformation. The method comprises the steps of analyzing one or more queries that are not supported by a target database system, and transforming the one or more queries into semantically equivalent queries that are supported by the target database system.

In accordance with another embodiment of the present invention, there is provided a computer-readable medium having computer readable code embodied therein for use in the execution in a computer of a method of client/server aggregate transformation. The method comprises the steps of analyzing one or more queries that are not supported by a target database system, and transforming the one or more queries into semantically equivalent queries that are supported by the target database system.

In accordance with another embodiment of the present invention, there is provided a computer program product for use in the execution in a computer of a query transformation system for transforming client/server aggregates. The computer program product comprises a client/server analysis component for analyzing one or more queries that are not supported by a target database system, and a client/server transformation component for transforming the one or more queries into semantically equivalent queries that are supported by the target database system.

DETAILED DESCRIPTION OF THE PREFERRED EMBODIMENTS

Figure 1:
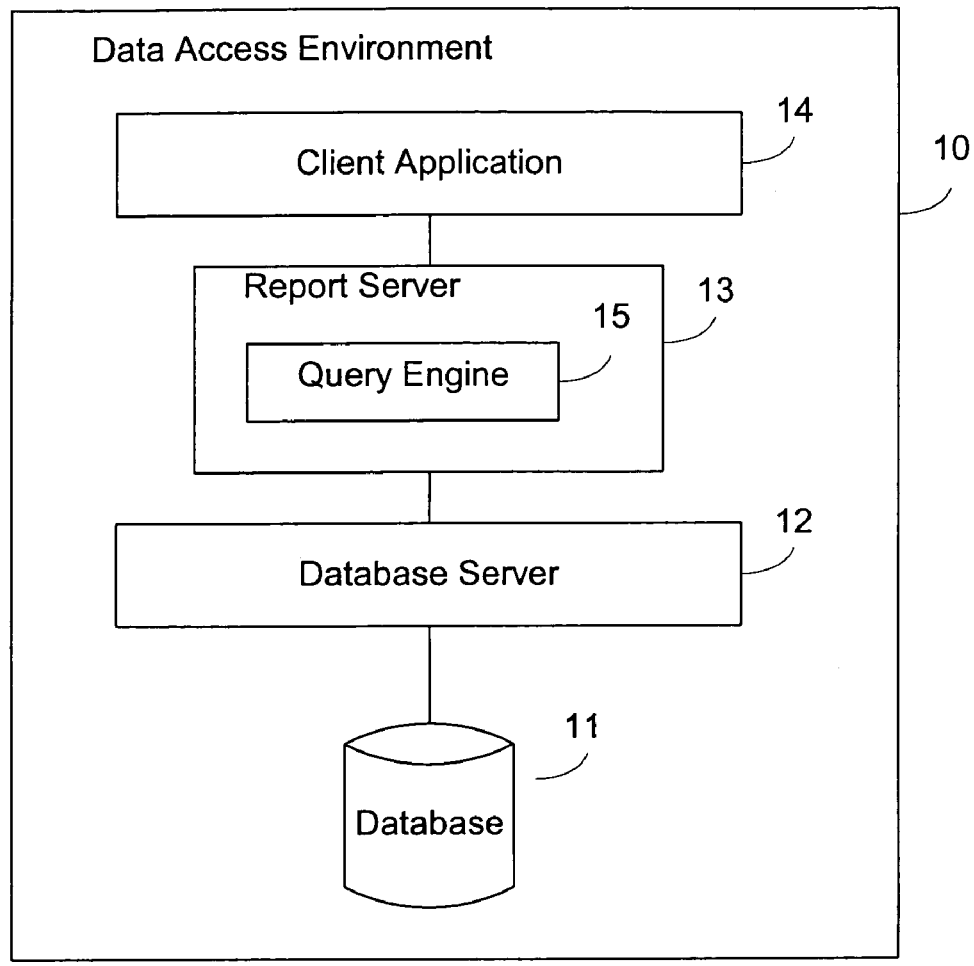
FIG. 1 shows a typical data access environment.

FIG. 1 shows a typical data access environment 10 for processing data. Typically, data is stored in a database 11. A DBMS running on a database server 12 accesses the raw data stored in the database 11. A query engine 15, running on a report server (or application server) 13 is used to generate reports on the raw data and instruct the DBMS on the database server 12 to obtain information pertaining to the raw data in the database 11. The query engine 15 provides universal data access to a variety of heterogeneous database systems. An end user uses a client application 14, running on a client workstation, to facilitate application server 13 operations.

In order to solve many business questions, a query engine 15 generates SQL queries that utilize the SQL/online analytical programming (OLAP) technology introduced in the SQL: 1999 standard. These SQL queries include SQL/OLAP functions (windowed aggregates). However, many database systems 12 do not support this technology. In order to prevent or reduce the amount of local (application server) processing required to process these types of queries, the query engine 15 attempts to generate semantically equivalent queries that can be processed in whole or in part on the database server 12 by the target database system. These semantically equivalent queries involve standard aggregate functions and the GROUP BY operator.

Figure 2:
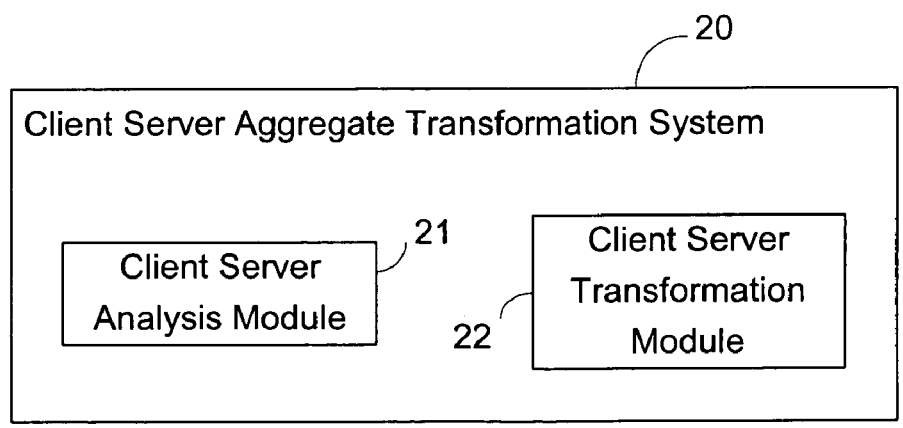
FIG. 2 shows a client/server aggregate transformation system, in accordance with an embodiment of the present invention.

FIG. 2 shows, a Client/Server Aggregate transformation system 20, in accordance with an embodiment of the present invention. The Client/Server Aggregate transformation system 20 comprises a Client/Server analysis module 21 for analysing SQL/OLAP queries that are not supported by a target database system, and a Client/Server transformation module 22 for transforming these SQL/OLAP queries into semantically equivalent queries that are supported by the target database system.

The Client/Server Aggregate transformation system 20 is implemented as a sub-system of the query engine 15 in the data access environment 10. This transformation 20 may generate queries that can be processed in their entirety on the database server 12, or queries that require processing on both the application server 13 and the database server 12.

Advantageously, the Client/Server Aggregate transformation system 20 reduces processing that might otherwise be required on the application server by generating a semantically equivalent query, thereby improving performance in many cases. Furthermore, the Client/Server Aggregate transformation system 20 takes advantage of functionality provided by the target database. In particular, the Client/Server Aggregate system 20 utilizes the functionality provided by standard aggregates and the GROUP BY operator.

There are two types of OLAP functions: framed functions and report functions. Framed OLAP functions contain a window frame specification (ROWS or RANGE) and an ORDER BY clause. Through window frames, capabilities such as cumulative (running) sums and moving averages can be supported. Report functions do not contain a window frame specification, and produce the same value for each row in a partition.

The Client/Server Aggregate transformation attempts to reduce the number of derived tables generated in a SQL group transformation by computing some of the aggregates locally. This transformation can be utilized when the user is willing to tolerate some (local) processing on the application server.

Figure 3:
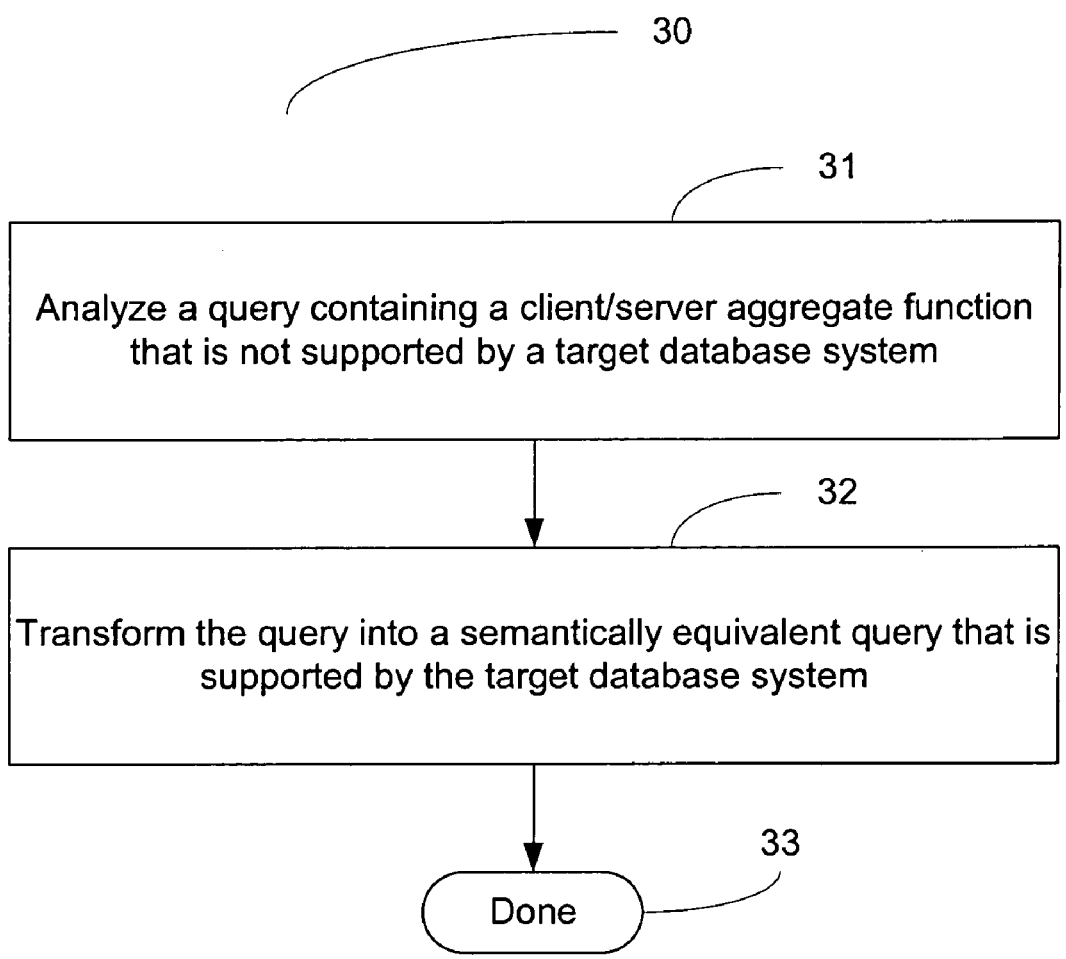
FIG. 3 shows in a flowchart an example of a method of client/server aggregate transformation, in accordance with the client/server aggregate transformation system.

FIG. 3 shows a flowchart of an example of a method of Client/Server Aggregate transformation (30), in accordance with an embodiment of the Client/Server Aggregate transformation system 20. The method (30) begins with analysing a query containing a client/server aggregate that is not supported by a target database system (31). Next, the query is transformed into a semantically equivalent query that is supported by the target database system (32). The method (30) is done (33).

Figure 4:
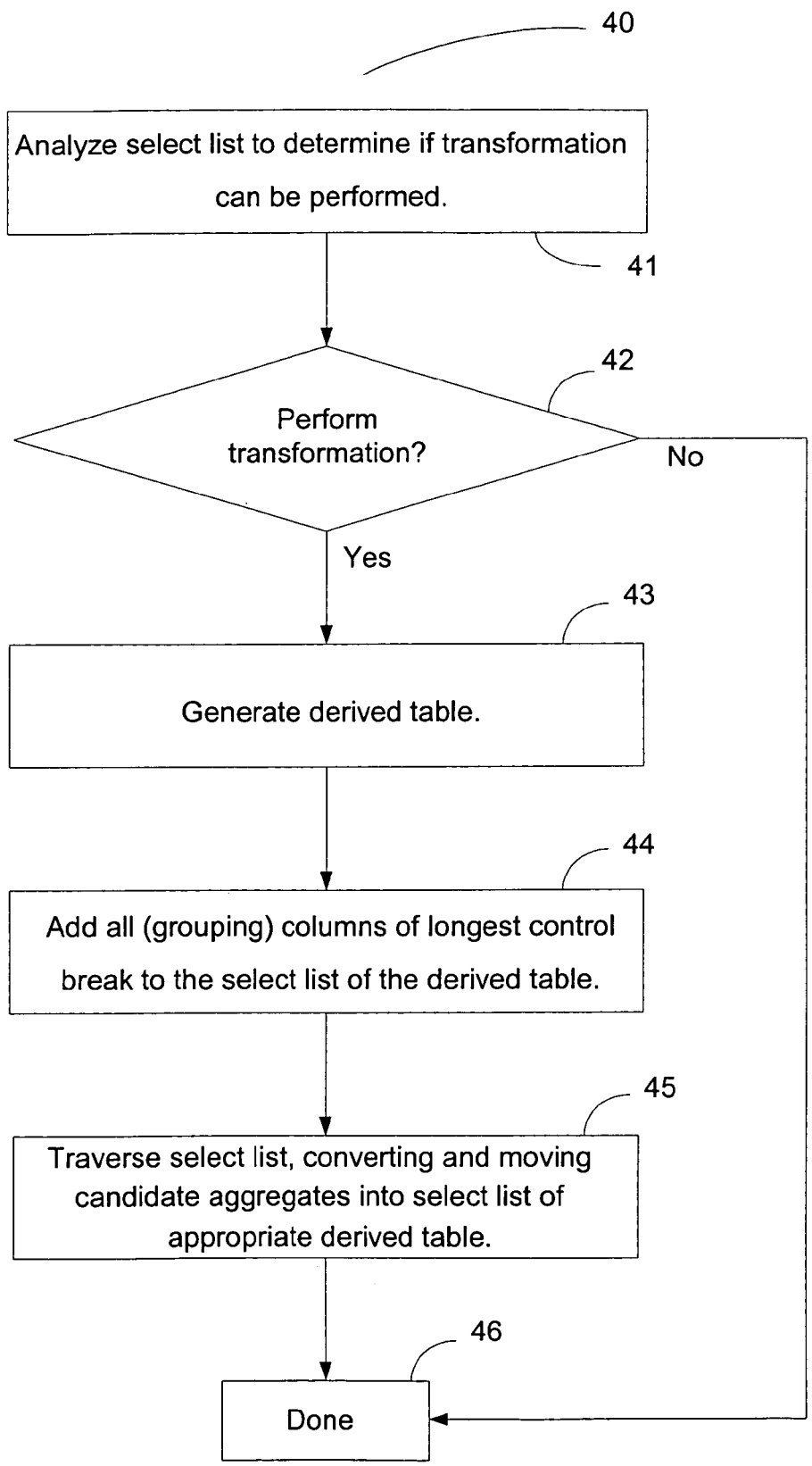
FIG. 4 shows in a flowchart another example of a method of client/server aggregate transformation, in accordance with the client/server aggregate transformation system.

FIG. 4 shows a flowchart of an example of a method of Client/Server Aggregate transformation (40), in accordance with an embodiment of the Client/Server Aggregate transformation system 20. The method (40) begins with analyzing a select list to determine if transformations can be performed (41). If transformations cannot be performed (42), the method (40) is done (46). If a transformation is to be performed (42), a derived table is generated (43). All (grouping) columns of the longest control break are added to the select list of the derived table (44). A control break is a set of columns over which a particular OLAP function is computed. A partition is a set of rows that have the same value for columns that make up the control break. Then the select list is traversed and candidate aggregates are convened and moved into the select list of the derived table (45). The method (40) is done (46).

To determine if the transformation can be performed, all expressions and aggregates in the select list are analyzed. This analysis consists of the following:

Assigning a group index. This index indicates whether the aggregate is eligible for transformation. Any aggregate assigned a group index of −1 is not eligible. Report aggregates are eligible, provided they have a standard aggregate counterpart (MIN, MAX, SUM, AVG, COUNT, COUNT(*)). Framed aggregates are not eligible.

Keeping track of all control breaks. Control break information is stored in an ordered list, with control breaks having the fewest number of columns (least amount of detail) appearing first.

The transformation can be performed if the following criteria are met:

The keyword DISTINCT is present in the select list.

All aggregates in the select list are eligible.

All control breaks are compatible. Assuming that the longest control break G is of the form $(C_1, C_2, \ldots, C_n)$, all other control breaks must be of the form $(C_1, C_2, \ldots, C_k)$, where $0 \leq k \leq n$. Note that the control break 0 is compatible with all control breaks.

Any simple column reference in the select list that is not part of an aggregate specification is contained in the G, or is part of an expression contained in G.

In performing the transformation, the following assumptions are made:

m equals the total number of unique control breaks n equals the number of columns in the longest control break G represents the list of columns in the longest control break, known as the set of grouping columns AGG ($C_0$) represents the standard form of the aggregate AGG($C_0$) OVER( . . . )

Given these assumptions, the basic steps in performing the transformation are as follows:

1. Construct a new select list (known as die inner select list) to hold columns and standard aggregates.
2. Traverse all expressions in the original select list.
3. If the expression is a simple column reference or it is contained in G, copy it to the inner select list. Otherwise, traverse the expression, and apply the rules outlined here.
4. Apply one of the following transformations if m>1 or k≠n.
   a. If the expression is an aggregate is of the form AVG ($C_0$) OVER( ), replace it with an expression of the form SUM(SUM($C_0$)) OVER( )/SUM(COUNT($C_0$)) OVER( ) and move the standard (nested) aggregates into the inner select list.
   b. If the expression is an aggregate is of the form AVG ($C_0$) OVER(PARTITION BY $C_1, C_2, \ldots, C_k$), replace it with an expression of the form SUM(SUM($C_0$) OVER(PARTITION BY $C_1, C_2, \ldots, C_k$)) OVER( )/ SUM(COUNT($C_0$) OVER(PARTITION BY $C_1, C_2, \ldots, C_k$)) OVER( ) and move the standard (nested) aggregates into the inner select list.
5. If the expression is an aggregate of the form AGG($C_0$) OVER(PARTITION BY $C_1, C_2, \ldots, C_n$), replace it with AGG($C_0$), and move it into the inner select.
6. If the expression is an aggregate of the form AGG($C_0$) OVER(PARTITION BY $C_1, C_2, \ldots, C_k$), where k≠n, replace it with AGG(AGG($C_0$)) OVER(PARTITION BY $C_1, C_2, \ldots, C_k$), and move the standard (nested) aggregate into the inner select list.
7. Construct the final query. This consists of constructing a derived table containing a GROUP BY query for computing the standard aggregates in the inner select list.

For the purpose of discussion, assume the target database for the following examples does not support the SQL/OLAP technology introduced in the SQL: 1999 standard. The native SQL shown in each example is the SQL passed to the target database.

EXAMPLE 1

In this example, multiple SUM functions with compatible control breaks are present, so the transformation is straightforward.

| Original Query | |
| --- | --- |
| SELECT | DISTINCT SNO, PNO, |
| | SUM( QTY ) OVER ( ), |
| | SUM( QTY ) OVER ( PARTITION BY SNO ), |
| | SUM( QTY ) OVER ( PARTITION BY SNO, PNO ) |
| FROM | SUPPLY |

| Transformed Query | | |
| --- | --- | --- |
| SELECT | C0, C1, | |
| | SUM( C2 ) OVER ( ), | |
| | SUM( C2 ) OVER ( PARTITION BY SNO ), | |
| | C2 | |
| FROM ( | SELECT | SNO C0, PNO C1, SUM( QTY ) C2 |
| | FROM | SUPPLY |
| | GROUP | BY SNO, PNO ) T1 |

| Native SQL | |
| --- | --- |
| SELECT | SNO C0, PNO C1, SUM( QTY ) C2 |
| FROM | SUPPLY |
| GROUP | BY SNO, PNO |

Explanation

The original query contains OLAP SUM functions computed over the partitions ( ), (SNO), and (SNO, PNO). Because of the presence of the DISTINCT keyword, and the fact that the detail columns (SNO and PNO) are pan of a PARTITION BY clause, the query can be rewritten using a single derived table that computes the sum with the finest granularity (SNO, PNO). The remaining SUM functions can be computed based on this value, as shown in the transformed query.

EXAMPLE 2

In this example, multiple SUM functions with compatible control breaks are present, but an AVG function has been introduced, making the transformation a little more complex.

| Original Query | |
| --- | --- |
| SELECT | DISTINCT SNO, PNO, |
| | SUM( QTY ) OVER ( ), |
| | SUM( QTY ) OVER ( PARTITION BY SNO ), |
| | SUM( QTY ) OVER ( PARTITION BY SNO, PNO ), |
| | AVG( QTY ) OVER ( ) |
| FROM | SUPPLY |

| Transformed Query | | |
| --- | --- | --- |
| SELECT | C0, | |
| | C1, | |
| | SUM( C2 ) OVER ( ), | |
| | SUM( C2 ) OVER ( PARTITION BY SNO ), | |
| | C2, | |
| | SUM( C2 ) OVER ( ) / SUM( C3 ) OVER ( ) | |
| FROM ( | SELECT | SNO C0, PNO C1, SUM( QTY ) C2, COUNT( QTY ) C3 |
| | FROM | SUPPLY |
| | GROUP | BY SNO, PNO ) T1 |

| Native SQL | |
| --- | --- |
| SELECT | SNO C0, PNO C1, SUM( QTY ) C2, COUNT( QTY ) C3 |
| FROM | SUPPLY |
| GROUP | BY SNO, PNO |

Explanation

The original query contains OLAP SUM functions computed over the partitions ( ), (SNO), and (SNO, PNO). It also contains an OLAP AVG function computed over the partition ( ). Because of the presence of the DISTINCT keyword, and the fact that the detail columns (SNO and PNO) are pan of a PARTITION BY clause, the query can be rewritten using a single derived table that computes the sum with the finest granularity (SNO, PNO). The remaining SUM functions can be computed based on this value, as shown in the transformed query. This value can be used to compute the average as well. However, we also require a count to be computed at the lowest level of granularity. The final average is then computed as shown in the transformed query (average of an average will not work).

EXAMPLE 3

In this example, the OLAP functions SUM and AVG have identical control breaks corresponding to the required detail information (SNO, PNO), so the entire query can be replaced with a simple GROUP BY query.

| Original Query | |
|---|---|
| SELECT | DISTINCT SNO, PNO, |
| | SUM( QTY ) OVER ( PARTITION BY SNO, PNO ), |
| | AVG( QTY ) OVER ( PARTITION BY SNO, PNO ), |
| FROM | SUPPLY |

| Transformed Query | |
|---|---|
| SELECT | SNO C0, PNO C1, SUM( QTY ) C2, AVG( QTY ) C3 |
| FROM | SUPPLY |
| GROUP | BY SNO, PNO |

| Native SQL | |
|---|---|
| SELECT | SNO C0, PNO C1, SUM( QTY ) C2, AVG( QTY ) C3 |
| FROM | SUPPLY |
| GROUP | BY SNO, PNO |

Explanation

The original query contains two OLAP functions computed over the partition (SNO, PNO). This partition represents the grouping columns in the transformed query. Because of the presence of the DISTINCT keyword, and the fact that the detail columns (SNO and PNO) are grouping columns, the query can be rewritten as a simple GROUP BY query.

EXAMPLE 4

In this example, the OLAP functions SUM and AVG have identical control breaks corresponding to the required detail information (SNO, PNO), so the entire query can be replaced with a simple GROUP BY query.

| Original Query | |
|---|---|
| SELECT | DISTINCT SNO, PNO, |
| | SUM( QTY ) OVER ( ), |
| | SUM( QTY ) OVER ( PARTITION BY SNO ) |
| FROM | SUPPLY |

| Transformed Query | |
|---|---|
| SELECT | C0, C1, SUM( C2 ) OVER ( ), SUM( C2 ) OVER ( PARTITION BY C0 ) |
| FROM ( | SELECT SNO C0, PNO C1, SUM( QTY ) C2 |
| | FROM SUPPLY |
| | GROUP BY SNO, PNO ) T1 |

| Native SQL | |
|---|---|
| SELECT | SNO C0, PNO C1, SUM( QTY ) C2 |
| FROM | SUPPLY |
| GROUP | BY SNO, PNO |

Explanation

The original query contains two SUM functions computed over the partitions ( ) and (SNO); The longest control break (SNO), however, does nor correspond to the detail information required (SNO, PNO). Hence, the derived table generated consists of a GROUP BY query that computes a sum grouped on (SNO, PNO). Both of the outer sum values are then computed based on this value.

A system for query transformation may comprise an analysis component and a transformation component. The analysis component may comprise a Nested Aggregate analysis module, a SQL GROUP transformation analysis module, a summary filter transformation analysis module, and a Summary Filler analysis module. The transformation component may comprise a Nested Aggregate transformation module, a SQL GROUP transformation module, a Client/Server Aggregate transformation module, and a Summary Filter transformation module.

The systems and methods according to the present invention may be implemented by any hardware, software or a combination of hardware and software having the functions described above. The software code, either in its entirety or a pan thereof, may be stored in a computer readable memory. Further, a computer data signal representing the software code that may be embedded in a carrier wave may be transmitted via a communication network. Such a computer readable-memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A method of transforming an unsupported database query into a supported database query that can be fully computed by a target database, the unsupported database query comprising a select list including a plurality of expressions, the plurality of expressions each having a control break, the plurality of expressions including an expression that cannot be directly computed by the target database, the method comprising:

constructing a derived table from the unsupported database query, wherein constructing the derived table comprises:
constructing a new select list of the derived table;
traversing the plurality of expressions of the select list of the unsupported database query and for each of the expressions:
determining a corresponding expression to add to the new select list, wherein determining the corresponding expression to add to the new select list comprises determining an aggregate of the expression and determining a control break of the aggregate;
adding the corresponding expression to the new select list;
adding the control break of the expression to an ordered list of control breaks, wherein the ordered list is ordered from a shortest control break with a fewest number of columns to a longest control break with a highest number of columns; and
when the control break of the aggregate has fewer columns than the longest control break of the order list of control breaks, and the aggregate of the expression is of the form $AGG(C_0)$: replacing the expression $AGG(C_0)$ OVER (PARTITION BY $C_1$, $C_2$, ..., $C_k$) with an expression of the form AGG $(AGG(C_0))$ OVER(PARTITION $C_1$, $C_2$, ..., $C_k$), where each C is a column, where n is a number of columns in the longest control break, and where k is a number of columns in the other control break; and
adding a GROUP BY expression to the derived table based on the new select list of the derived table;
determining the unsupported database query can be transformed into a supported database query, wherein determining the unsupported database query can be transformed into the supported database query comprises determining all control breaks of the unsupported database query are compatible based on the ordered list; and
constructing the supported database query using the unsupported database query and the derived table.

2. The method as claimed in claim 1, wherein constructing the supported database query comprises:
adding to a select list of the supported database query, expressions of the select list of the unsupported database query with a standard expression referencing the corresponding expression added to the new select list of the derived table; and
replacing a FROM table of the unsupported database query with a reference to the derived table.

3. The method as claimed in claim 1, further comprising:
for each expression, determining the control break of the expression is not already in the ordered list prior to adding the control break of the expression to the ordered list.

4. The method as claimed in claim 1, the method further comprising, when the control break of the aggregate of the expression has no columns, and the aggregate of the expression is of the form $AVG(C_0)$:
replacing the expression $AVG(C_0)$ OVER ( ) with an expression of the form $SUM(SUM(C_0))$ OVER( )/SUM $(COUNT(C_0))$ OVER( ), where $C_0$ is a column.

5. The method as claimed in claim 4, further comprising, when the control break of the aggregate of the expression has one or more columns found in the longest control break in the ordered list, and the aggregate of the expression is of the form AVG(C0):
replacing the expression $AVG(C_0)$ OVER (PARTITION BY $C_1$, $C_2$, ..., $C_n$)) with an expression of the form $SUM(SUM(C_0)$ OVER (PARTITION BY $C_1$, $C_2$, ..., $C_n$)) OVER( )/SUM(COUNT($C_0$) OVER (PARTITION BY $C_1$, $C_2$, ..., $C_n$)) OVER( ), where each C is a column and where n is the number of columns in the longest control break.

6. The method as claimed in claim 1, the method further comprising, when the control break of the aggregate is the same as the longest control break of the order list of control breaks, and the aggregate of the expression is of the form $AGG(C_0)$:
replacing the expression $AGG(C_0)$ OVER (PARTITION BY $C_1$, $C_2$, ..., $C_n$) with an expression of the form $AGG(C_0)$, where each C is a column and where n is the number of columns in the longest control break.

7. The method as claimed in claim 1, where aggregates of the form AGG comprise one of MIN, MAX, SUB, COUNT.

8. The method as claimed in claim 1, wherein determining the unsupported database query can be transformed into a supported database query further comprises:
determining a DISTINCT keyword is present in the select list of the unsupported database query;
determining all aggregates of the expressions are eligible for transformation; and
determining simple column references in the select list of the unsupported database query are found in the longest control break of the unsupported database query, when the simple column references are not part of a speciation of one of the aggregates of the unsupported database query.

9. The method as claimed in claim 8, wherein determining an aggregate is eligible comprises:
determining the aggregate is a report aggregate that has a standard aggregate counterpart.

10. The method as claimed in claim 8, wherein determining all control breaks are compatible comprises:
determining the longest control break is of the form ($C_1$, $C_2$, ..., $C_n$) and all other control breaks are of the form ( ) or of the form ($C_1$, $C_2$, ..., $C_k$) where $0<=k<=n$, where:
each C is a column;
n is the number of columns in the longest control break; and
k is the number of columns in the other control break.

11. A computer program product comprising a computer readable memory having computer readable code embodied therein for use in the execution in a computer of a method of transforming an unsupported database query into a supported database query that can be fully computed by a target database, the unsupported database query comprising a select list including a plurality of expressions, the plurality of expressions each having a control break, the plurality of expressions including an expression that cannot be directly computed by the target database, the computer comprising a processor coupled to the computer storage medium for executing the computer readable code, the method comprising:
constructing a derived table from the unsupported database query, wherein constructing a derived table from the unsupported database query comprises:
constructing a new select list of the derived table;
traversing the plurality of expressions of the select list of the unsupported database query and for each of the expressions:

determining a corresponding expression to add to the new select list, wherein determining the corresponding expression to add to the new select list comprises determining an aggregate of the expression and determining the control break of the aggregate;

adding the corresponding expression to the new select list;

adding the control break of the expression to an ordered list of control breaks, wherein the ordered list is ordered from a shortest control break with a fewest number of columns to a longest control break with a highest number of columns; and when the control break of the aggregate has fewer columns than the longest control break of the order list of control breaks, and the aggregate of the expression is of the form $AGG(C_0)$: replacing the expression $AGG(C_0)$ OVER (PARTITION BY $C_1$, $C_2, \ldots, C_k$) with an expression of the form AGG $(AGG(C_0))$ OVER (PARTITION $C_1, C_2, \ldots, C_k$), where each C is a column, where n is a number of columns in the longest control break, and where k is a number of columns in the other control break; and adding a GROUP BY expression to the derived table based on the new select list of the derived table;

determining the unsupported database query can be transformed into a supported database query, wherein determining the unsupported database query can be transformed into a supported database query comprises determining all control breaks of the unsupported database query are compatible based on the ordered list; and constructing the supported database query using the unsupported database query and the derived table.

12. The computer program product as claimed in claim 11, wherein constructing the supported database query comprises:

adding to a select list of the supported database query, expressions of the select list of the unsupported database query with a standard expression referencing the corresponding expression added to the new select list of the derived table; and replacing a FROM table of the unsupported database query with a reference to the derived table.

13. The computer program product as claimed in claim 11, the method further comprising:

when the control break of the aggregate of the expression has no columns, and the aggregate of the expression is of the form $AVG(C_0)$, replacing the expression $AVG(C_0)$ OVER ( ) with an expression of the form $SUM(SUM(C_0))$ OVER( )/SUM(COUNT($C_0$)) OVER( ) where $C_0$ is a column; and when the control break of the aggregate of the expression has one or more columns found in the longest control break in the ordered list, and the aggregate of the expression is of the form AVG(C0), replacing the expression $AVG(C_0)$ OVER (PARTITION BY $C_1, C_2, \ldots, C_n$)) with an expression of the form SUM(SUM($C_0$) OVER (PARTITION BY $C_1, C_2, \ldots, C_n$)) OVER( )SUM (COUNT($C_0$) OVER (PARTITION BY $C_1, C_2, \ldots, C_n$))OVER( ), where each C is a column and where n is the number of columns in the longest control break.

14. The computer program product as claimed in claim 11, the method further comprising:

when the control break of the aggregate is the same as a longest control break of the order list of control breaks, and the aggregate of the expression is of the form AGG ($C_0$), replacing the expression $AGG(C_0)$ OVER (PARTITION BY $C_1, C_2, \ldots, C_n$) with an expression of the form $AGG(C_0)$, where each C is a column and where n is the number of columns in the longest control break.

15. The computer program product as claimed in claim 11, wherein determining the unsupported database query can be transformed into a supported database query further comprises:

determining a DISTINCT keyword is present in the select list of the unsupported database query;

determining all aggregates of the expressions are eligible for transformation; and determining simple column references in the select list of the unsupported database query are found in the longest control break of the unsupported database query, when the simple column references are not part of a speciation of one of the aggregates of the unsupported database query, wherein determining an aggregate is eligible comprises determining the aggregate is a report aggregate that has a standard aggregate counterpart; and wherein determining all control breaks are compatible comprises:

determining the longest control break is of the form ($C_1$, $C_2, \ldots, C_n$) and all other control breaks are of the form ( ) or of the form ($C_1, C_2, \ldots, C_k$) where 0<=k<=n, where:

each C is a column;

n is the number of columns in the longest control break; and k is the number of columns in the other control break.

16. A computer comprising:

a processor; and a computer readable memory having computer readable code embodied therein for use in the execution by the processor of a method of transforming an unsupported database query into a supported database query that can be fully computed by a target database, the unsupported database query comprising a select list including a plurality of expressions, the plurality of expressions each having a control break, the plurality of expressions including an expression that cannot be directly computed by the target database, the method comprising:

constructing a derived table from the unsupported database query, wherein constructing a derived table from the unsupported database query comprises:

constructing a new select list of the derived table;

traversing the plurality of expressions of the select list of the unsupported database query and for each of the expressions:

determining a corresponding expression to add to the new select list, wherein determining the corresponding expression to add to the new select list comprises determining an aggregate of the expression and determining the control break of the aggregate;

adding the corresponding expression to the new select list;

adding the control break of the expression to an ordered list of control breaks, wherein the ordered list is ordered from a shortest control break with a fewest number of columns to a longest control break with a highest number of columns;

when the control break of the aggregate has fewer columns than the longest control break of the order list of control breaks, and the aggregate of the expression is of the form $AGG(C_0)$: replacing the expression $AGG(C_0)$ OVER (PARTITION BY $C_1$, $C_2, \ldots, C_k$) with an expression of the form AGG (AGG($C_0$)) OVER (PARTITION $C_1, C_2, \ldots, C_k$), where each C is a column, where n is a number of columns in the longest control break, and where k is a number of columns in the other control break; and adding a GROUP BY expression to the derived table based on the new select list of the derived table;

determining the unsupported database query can be transformed into a supported database query, wherein determining the unsupported database query can be transformed into a supported database query comprises determining all control breaks of the unsupported database query are compatible based on the ordered list; and constructing the supported database query using the unsupported database query and the derived table.

17. The computer as claimed in claim 16, the method further comprising:

when the control break of the aggregate of the expression has no columns, and the aggregate of the expression is of the form AVG($C_0$), replacing the expression AVG($C_0$) OVER ( ) with an expression of the form SUM(SUM($C_0$)) OVER( )/SUM(COUNT($C_0$)) OVER( ) where $C_0$ is a column; and when the control break of the aggregate of the expression has one or more columns found in the longest control break in the ordered list, and the aggregate of the expression is of the form AVG(C0), replacing the expression AVG($C_0$) OVER (PARTITION BY $C_1, C_2, \ldots, C_n$)) with an expression of the form SUM(SUM($C_0$) OVER (PARTITION BY $C_1, C_2, \ldots, C_n$)) OVER( )SUM (COUNT($C_0$) OVER (PARTITION BY $C_1, C_2, \ldots, C_n$))OVER( ) where each C is a column and where n is the number of columns in the longest control break.

18. The computer as claimed in claim 16, the method further comprising:

when the control break of the aggregate is the same as the longest control break of the order list of control breaks, and the aggregate of the expression is of the form AGG ($C_0$), replacing the expression AGG($C_0$) OVER (PARTITION BY $C_1, C_2, \ldots, C_n$) with an expression of the form AGG($C_0$), where each C is a column and where n is the number of columns in the longest control break.

19. The computer as claimed in claim 16, wherein determining that the unsupported database query can be transformed into a supported database query further comprises:

determining a DISTINCT keyword is present in the select list of the unsupported database query;

determining all aggregates of the expressions are eligible for transformation; and determining simple column references in the select list of the unsupported database query are found in the longest control break of the unsupported database query, when the simple column references are not part of a speciation of one of the aggregates of the unsupported database query, wherein determining an aggregate is eligible comprises determining that the aggregate is a report aggregate that has a standard aggregate counterpart; and wherein determining all control breaks are compatible comprises:

determining the longest control break is of the form ($C_1, C_2, \ldots, C_n$) and all other control breaks are of the form ( ) or of the form ($C_1, C_2, \ldots, C_k$) where $0<=k<=n$, where:

each C is a column;

n is the number of columns in the longest control break; and k is the number of columns in the other control break.

* * * * *